US012606775B2

(12) United States Patent
Schymitzek et al.

(10) Patent No.: US 12,606,775 B2
(45) Date of Patent: Apr. 21, 2026

(54) SANITARY AGENT IN GEL FORM FOR PREVENTING BIOFILMS

(71) Applicant: Henkel AG & Co. KGaA, Duesseldorf (DE)

(72) Inventors: Tatiana Schymitzek, Krefeld (DE); Daniela Poethkow, Krefeld (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 358 days.

(21) Appl. No.: 17/498,594

(22) Filed: Oct. 11, 2021

(65) Prior Publication Data

US 2022/0025297 A1 Jan. 27, 2022

Related U.S. Application Data

(63) Continuation of application No. PCT/EP2020/060077, filed on Apr. 8, 2020.

(30) Foreign Application Priority Data

Apr. 10, 2019 (EP) .................................... 19168321

(51) Int. Cl.

| | |
|---|---|
| ***C11D 1/00*** | (2006.01) |
| ***C11D 1/83*** | (2006.01) |
| ***C11D 17/00*** | (2006.01) |
| ***C11D 17/04*** | (2006.01) |
| ***E03D 9/03*** | (2006.01) |
| *C11D 1/14* | (2006.01) |
| *C11D 1/72* | (2006.01) |
| *E03D 9/02* | (2006.01) |

(52) U.S. Cl.

CPC .......... *C11D 1/8305* (2013.01); *C11D 17/003* (2013.01); *C11D 17/046* (2013.01); *E03D 9/032* (2013.01); *C11D 1/146* (2013.01); *C11D 1/72* (2013.01); *C11D 2111/14* (2024.01); *E03D 2009/026* (2013.01)

(58) Field of Classification Search

None

See application file for complete search history.

(56) References Cited

U.S. PATENT DOCUMENTS

| | | | | |
|---|---|---|---|---|
| 10,785,989 | B2 * | 9/2020 | Rodriguez Jerez | C11D 3/38618 |
| 2013/0130962 | A1 | 5/2013 | Leipold et al. | |
| 2013/0331308 | A1 * | 12/2013 | Rees | C11D 3/40 510/494 |
| 2017/0283743 | A1 * | 10/2017 | Trebbe | A61K 8/042 |

FOREIGN PATENT DOCUMENTS

| | | | |
|---|---|---|---|
| DE | 19715872 | A1 | 10/1998 |
| DE | 10048887 | A1 | 4/2002 |
| DE | 102004056554 | A1 | 5/2006 |
| EP | 1029911 | A1 | 8/2000 |
| EP | 1086199 | B1 | 5/2002 |
| EP | 1894989 | A1 | 3/2008 |
| WO | 2014033259 | A1 | 3/2014 |
| WO | 2019002187 | A1 | 1/2019 |

OTHER PUBLICATIONS

International Search Report PCT/EP2020/060077 Completed: Jul. 29, 2020; Mailing Date: Aug. 17, 2020 3 Pages.

State Intellectual Property Office, First Review Opinion Notice, CN Patent Application No. 202080027124.2, Sep. 28, 2023, pp. 1-11, Beijing, CN.

Functional Surfactant, Liang Zhiqi, et al., pp. 362-366, China Light Industry Press, publication date: Apr. 30, 2002.

Decision of Rejection Letter, from Sean Yang, NTD Patent & Trademark Agency Ltd, Beijing Office, dated Nov. 24, 2024.

CN 202080027124.2, Decision of Rejection, dated Oct. 21, 2024.

* cited by examiner

*Primary Examiner* — Necholus Ogden, Jr.

(74) *Attorney, Agent, or Firm* — Bojuan Deng

(57) ABSTRACT

A system having a WC basket that has at least one chamber, wherein: a self-adhesive sanitary agent in gel form is present in the chamber of the WC basket and adheres to the chamber sleeve; the chamber sleeve is completely closed on at least one side, and the agent adheres to the completely closed side of the chamber sleeve; the sanitary agent has at least one non-ionic adhesion promoter; the non-ionic adhesion promoter has at least one hydrophobic functional group and also includes a hydrophilic group; and the agent is acidic.

17 Claims, No Drawings

SANITARY AGENT IN GEL FORM FOR PREVENTING BIOFILMS

FIELD OF THE INVENTION

Sanitary agents in gel form are known from the prior art. Such agents are used as self-adhesive sanitary agents. These self-adhesive sanitary agents are suitable for adhering to surfaces independently, i.e., without any further auxiliary agents. In particular, toilet rim blocks which have a self-adhesive composition are known from the prior art. Such toilet rim blocks can be attached to the wall of the toilet bowl without a basket and adhere to said wall by themselves even after a number of flushing processes. For example, a self-adhesive sanitary agent in the form of a gel is described in EP 1086199B1, which gel adheres by itself to the surfaces of objects, such as toilet bowls, that are usually used in sanitary areas, and is flushed away from the toilet surface only after several flushes. DE 10 2004 056554 A1, EP 1 894 989 A1 and WO 2014/033259 A1 also describe such gels which are attached to the wall of the toilet bowl by means of an applicator and without a basket. Such an application is also referred to as a "cageless" application.

BACKGROUND OF THE INVENTION

Non-self-adhesive gels are also described in the prior art. These gels do not adhere to the inner wall of the basket and are described in DE 197 15 872 A1 and EP 1 029 911 A1. These gels are deformable under the action of force.

In addition to gel-shaped cleaning agents, solid cleaning-agent shaped bodies are also known which, if they are used in a basket, are referred to as rim blocks.

According to one aspect of the invention, a system is provided, having a WC basket that has at least one chamber, a self-adhesive sanitary agent in gel form being present in the chamber of the WC basket and adhering to the chamber sleeve, and the chamber sleeve being completely closed on at least one side, and the agent adhering to the completely closed side of the chamber sleeve, and the sanitary agent having at least one non-ionic adhesion promoter, and the non-ionic adhesion promoter having at least one hydrophobic functional group and also comprising a hydrophilic group, the agent being acidic.

BRIEF SUMMARY OF THE INVENTION

The use of a self-adhesive agent in a WC basket in the form of a gel allows a visually attractive, transparent product which has advantageous release characteristics with regard to dyes and, in particular, fragrances. Due to the self-adhesive properties of the gel, said gel adheres to the surface of the WC basket. This has the advantage that the gel contained in the basket is not dissolved from the outside to the inside, as is the case with conventional toilet rim blocks, but has a dissolving behavior to the effect that the quantities of gel that adhere directly to the chamber wall of the WC basket are flushed away last. This results in particular in an improved release profile and a visually more attractive appearance over the entire service life of the WC rim block. Since the regions of the gel that the user can see from the outside, for example when using a transparent WC basket, are not removed until the end of its life, the original appearance of the WC rim block will hardly change until same is completely used up.

Furthermore, the system according to the invention comprising a basket and a self-adhesive gel offers advantages over "cageless" gels which are adhered to the surface of the toilet bowl using an applicator. In particular, the use of a basket, unlike for the "cageless" application, allows the basket comprising the gel to be placed just below the toilet rim and aligned with respect to the flushing water flow so that water is directed in a targeted manner to the place where the gel is located. This allows better flushing behavior than for "cageless" applications.

Thus, the system according to the invention comprising a basket and a self-adhesive gel offers advantages over a system comprising a basket and a non-self-adhesive gel. In particular, it was found that for non-self-adhesive gels, the consumer can see that these gels are used up after several flushing cycles and thus the original visual impression is not retained. The case is different for the present invention, where the regions of the gel that the user can see from the outside, for example when using a transparent WC basket, are removed only at the very end of their life and the original visual impression is thus retained.

Furthermore, the system according to the invention comprising a basket and a self-adhesive gel offers advantages over solid toilet rim blocks, referred to as rim blocks. In particular, it was found that solid toilet rim blocks are removed evenly on all sides. The case is different for the present invention, where the regions of the gel that the user can see from the outside, for example when using a transparent WC basket, are removed only at the very end of their life and the original visual impression is thus retained.

In toilets, biofilms can also quickly form in the flushing bowl. For reasons of hygiene, it is desirable to prevent biofilm formation or to remove existing biofilms. Microorganisms can easily settle in a basket in particular. In particular with solid gels (in contrast to solid toilet rim blocks), which intrinsically have a high water content, there is a risk of microorganisms multiplying and thus the risk of biofilms forming on the gel and in particular in the basket. Due to the acidic nature of the agent, it is possible to provide a solid gel in a toilet basket without significant biofilm formation.

DETAILED DESCRIPTION OF THE INVENTION

According to a further preferred embodiment, a sanitary agent is provided, the agent having a pH of 2 to 6.5 or a pH of 2 to 6.

According to a preferred embodiment, the gel has a cubic phase.

According to a preferred embodiment, a sanitary agent is provided, the sanitary agent also having an anionic surfactant.

According to a preferred embodiment, a sanitary agent is provided, the anionic surfactant being an ether sulfate, preferably a fatty acid ethyl ether sulfate and particularly preferably a sodium lauryl ether sulfate.

According to a preferred embodiment, a sanitary agent is provided, the anionic surfactant being present in an amount of 1 wt. % to 20 wt. %, preferably in an amount of 2 wt. % to 10 wt. %, based on the total amount of the agent.

According to a preferred embodiment, an agent is provided, the non-ionic adhesion promoter being a fatty alcohol alkoxylate which preferably has a degree of alkoxylation of 20 to 50 EO, preferably 20 to 35.

According to a preferred embodiment, a sanitary agent is provided, the agent having a further non-ionic surfactant. According to a preferred embodiment, an agent is provided, the further non-ionic surfactant being a fatty alcohol alkoxylate, preferably having a degree of alkoxylation of 5 to 15

EO. According to a preferred embodiment, an agent is provided, the fatty alcohol alkoxylate (further non-ionic surfactant) having a C9 to C12 alkyl functional group, and the alkyl functional group preferably being an unbranched alkyl functional group.

In connection with the present invention, the term “sanitary agent” is used in the sense of a “composition which is suitable for use as a sanitary agent.” If “sanitary agent” or simply “agent” is used in connection with the present invention, a gel composition is meant, unless otherwise indicated.

In connection with the present invention, the term “EO” stands for alkoxy groups in general. For example, the expression “20 EO” means the presence of 20 alkoxy groups, which are particularly preferably present as a block in the molecule in question and are even more preferably arranged as end groups in the molecule in question. In particular, the expression “EO” stands for the group containing ethoxy, propoxy and butoxy groups, more preferably for the group containing ethoxy and propoxy groups and particularly preferably only for ethoxy groups.

In connection with the present invention, “sanitary object” is preferably understood to mean an object that is usually used in areas of private or public bathrooms and toilets. In particular, toilets, preferably toilet bowls, urinals and pissoirs, and also handwashing sinks, are to be understood as sanitary objects.

In connection with the present invention, the terms “lipophilic” and “lipophilicity” are used synonymously with the terms “hydrophobic” and “hydrophilicity,” respectively.

In connection with the present invention, “make flowable” is understood to mean that the composition is heated to a point at which it has reached a viscosity at which the composition is flowable to such an extent that the composition can be poured out and thus can be transferred into another container, in particular the chamber of a WC basket.

The composition can contain polyols, preferably glycerol, in an amount of 3 wt. % to 35 wt. %, in particular 5 to 15 wt. %.

The gel composition is a component of the sanitary agent according to the invention and has a non-ionic adhesion promoter.

In the presence of water, the adhesion promoter ensures that the agent adheres to a surface and preferably forms network-like structures. These give the agent the required dimensional stability even when it is flushed in a toilet. The sanitary agent is preferably designed to be self-adhesive, i.e., the sanitary agent is suitable for adhering to surfaces independently, in particular without further auxiliary agents.

The adhesion promoter can either be entirely hydrophilic, but preferably partially hydrophilic and partially hydrophobic, i.e., the molecules of the adhesion promoter are preferably longer-chain molecules that have at least one hydrophobic functional group and also comprise a hydrophilic group that interacts with a preferably polar solvent, in particular with water. The adhesion promoters are preferably unbranched molecules, i.e., linear molecules. This allows the desired network formation.

Polyalkoxy groups, preferably polyethoxy groups, polypropoxy groups or polybutoxy groups, or mixed polyalkoxy groups such as poly(ethoxypropoxy) groups, can be used as hydrophilic functional groups. A fatty alcohol alkoxylate which has both ethoxy and propoxy groups is referred to in connection with the invention as a mixed fatty alcohol ethoxy propoxylate.

A particularly preferred hydrophilic group is a polyethoxy functional group which more preferably comprises between 15 and 55 ethoxy groups, even more preferably between 20 and 50 and particularly preferably between 22 and 28 ethoxy groups. Furthermore, polyethoxy functional groups having preferably between 35 and 50 ethoxy groups have also proven to be suitable.

Linear, i.e., unbranched, alkyl functional groups are preferably suitable as the hydrophobic functional group. This promotes the suitability for network formation. Even-numbered alkyl functional groups are preferred—due to their better biodegradability. Alkyl functional groups having at least more than eleven carbon atoms are particularly preferred. The number of carbon atoms is more preferably 9 to 30, in particular 7 to 25.

Preferred adhesion promoters are polyalkoxyalkanes, in particular a mixture of alkyl ethoxylate having 20 to 50 EO, in particular 25 EO or 40 EO, the alkyl chain more preferably having C16-25 carbon atoms.

As the number of alkoxy groups decreases, the adhesion promoter becomes more lipophilic. In particular, this allows the solubility of hydrophilic substances, such as fragrances or dyes, to be regulated.

As the degree of alkoxylation increases, the adhesion promoter becomes more hydrophilic, which in particular can influence the formation of a network and the ability to form a visually appealing gel and can also have an influence on the flushing behavior of the sanitary agent.

The type and, in particular, the length of the hydrophobic functional group also have an effect on the lipophilicity of the adhesion promoter, with longer alkyl functional groups in particular increasing the hydrophobicity of the adhesion promoter. Overall, owing to a suitable choice of the hydrophobic functional group, in particular a linear, i.e., unbranched, alkyl functional group, in coordination with the degree of alkoxylation, i.e., the number of alkoxy groups, a custom adhesion promoter can be provided which is optimized with regard to the flushing behavior of the sanitary agent, the adhesion to surfaces, as well as with regard to the solubility of hydrophobic or hydrophilic additives.

The amount of adhesion promoter to be used also depends on its hydrophilicity and its ability to form networks. This is preferably 10 and 40 wt. %, which is particularly preferred when using polyalkoxyalkanes.

“Fatty alcohol alkoxylates” within the meaning of the present invention are compounds which comprise at least one hydrophobic functional group and at least one hydrophilic group, the hydrophilic group being at least one EO unit which is bonded to the hydrophobic group. The hydrophobic functional group is derived in particular from aliphatic, long-chain, monohydric alcohols. These can occur naturally or synthetically, with natural alcohols being preferred. The hydrophobic functional group is preferably branched. The hydrophobic functional group preferably has between 6 to 22 carbon atoms and can also be mono- or polyunsaturated, with completely saturated groups being preferred.

The fatty alcohol alkoxylate preferably has a degree of alkoxylation of 10 to 50 EO, in particular of 20 to 45 EO. Alternatively, the fatty alcohol alkoxylate has a degree of alkoxylation of 5 to 15 EO.

The gel composition further preferably comprises a first fatty alcohol alkoxylate having a degree of alkoxylation of 10 to 50 EO, in particular of 20 to 45 EO, and a second fatty alcohol alkoxylate having a degree of alkoxylation of 5 to 15 EO.

In particular, the gel composition can contain a first fatty alcohol alkoxylate having a degree of alkoxylation of 20 to 30 EO in an amount of 15 to 40 wt. % (as the adhesion promoter) and a second fatty alcohol alkoxylate having a degree of alkoxylation of 5 to 15 EO in an amount of 2 to 20 wt. % (as the further non-ionic surfactant).

The fatty alcohol alkoxylate is preferably a fatty alcohol ethoxylate, the fatty alcohol alkoxylate having at least one ethoxy functional group and/or a fatty alcohol propoxylate, the fatty alcohol alkoxylate having at least one propoxy functional group. More preferably, the fatty alcohol alkoxylate exclusively comprises ethoxy and/or propoxy groups as alkoxy groups. Even more preferably, the fatty alcohol alkoxylate exclusively comprises ethoxy groups as alkoxy groups. The alkyl functional group preferably has at least 7 carbon atoms, in particular 7 to 20 carbon atoms, the alkyl group being in particular an unbranched alkyl group.

According to a preferred embodiment, a sanitary agent is described, the agent having an acidic pH, measured in a 10% solution of the agent in water, and the agent also comprising a first fatty alcohol alkoxylate having a degree of alkoxylation of 20 to 30 EO in an amount of 15 to 40 wt. % (as the adhesion promoter) and a second fatty alcohol alkoxylate having a degree of alkoxylation of 5 to 15 EO in an amount of 2 to 20 wt. % (as the further non-ionic surfactant).

According to a further preferred embodiment, a sanitary agent is described, the agent having an acidic pH, measured in a 10% solution of the agent in water, and the agent also comprising a first fatty alcohol alkoxylate having a degree of alkoxylation of 20 to 30 EO in an amount of 15 to 40 wt. % (as the adhesion promoter) and a second fatty alcohol alkoxylate having a degree of alkoxylation of 5 to 15 EO in an amount of 2 to 20 wt. % (as the further non-ionic surfactant) and an anionic surfactant in an amount of 2 to 10 wt. %.

According to a particularly preferred embodiment, a sanitary agent is described having at least one non-ionic adhesion promoter, the agent having a pH of 2 to 6, preferably 3 to 5, measured in a 10% solution of the agent in water, and the agent having an anionic surfactant, which is preferably an ether sulfate, preferably a fatty acid ethyl ether sulfate and particularly preferably a sodium lauryl ether sulfate, and the anionic surfactant being present in an amount of 1 wt. % to 20 wt. %, preferably in an amount of 2 wt. % to 10 wt. %, based on the total amount of the agent, and the non-ionic adhesion promoter being a fatty alcohol alkoxylate, which preferably has a degree of alkoxylation of 20 to 50 EO, preferably of 20 to 35, and is present in an amount of 15 to 35 wt. %, and the agent also having a further non-ionic surfactant, the further non-ionic surfactant being a fatty alcohol alkoxylate, having a degree of alkoxylation of 5 to 15 EO and a C9 to C12 alkyl functional group, and the further non-ionic surfactant being present in the composition in an amount of 2 to 12 wt. %.

According to a further particularly preferred embodiment, a sanitary agent is described having at least one non-ionic adhesion promoter, the agent having a pH of 2 to 6, preferably 3 to 5, measured in a 10% solution of the agent in water, and the agent having a sodium lauryl ether sulfate in an amount of 3 to 4 wt. %, and the non-ionic adhesion promotor being a fatty alcohol alkoxylate having 20 to 30 EO (ethoxy), and being present in an amount of 25 to 35 wt. %, and the agent also comprising a further non-ionic surfactant, the further non-ionic surfactant being a fatty alcohol alkoxylate, having a degree of alkoxylation of 5 to 10 EO (ethoxy), and having a C9 to C12 alkyl functional group and being present in an amount of 8 to 12 wt. %.

As an alternative to this embodiment and also preferably, a sanitary agent is described having at least one non-ionic adhesion promoter, the agent having a pH of 2 to 6, preferably 3 to 5, measured in a 10% solution of the agent in water, and the agent having a sodium lauryl ether sulfate in an amount of 5 to 10 wt. %, and the non-ionic adhesion promoter being a fatty alcohol alkoxylate having 20 to 30 EO (ethoxy) and being present in an amount of 15 to 25 wt. %, and the agent also comprising a further non-ionic surfactant, the further non-ionic surfactant being a fatty alcohol alkoxylate, having a degree of alkoxylation of 5 to 10 EO (ethoxy), and having a C9 to C12 alkyl functional group and being present in an amount of 2 to 7 wt. %.

The type and amount of the solvent depends, inter alia, on the hydrophilicity of the adhesion promoter used and can be varied accordingly. In order to provide the desired number of adhesive points using the adhesion promoter molecules, the solvent should contain at least 20 wt. %, preferably between 35 and 75 wt. %, based on the gel composition.

The solvent is preferably a polar solvent, more preferably an aqueous solvent, and in particular water. In particular, the gel composition comprises water in an amount between 40 and 75 wt. % based on the total amount of the gel composition.

The gel composition preferably comprises fragrances and/or odorants. This can improve the room air.

The gel composition preferably comprises preservatives. Such preservatives are available, for example, under the trade names Acticide B 20, Acticide MBR 1 and Acticide SR 1500. The gel composition preferably comprises, as the preservatives, one or more from the group containing isothiazolinone, phenoxyethanol, methylisothiazolinone and benzisothiazolinone (BIT). Preferably and depending on the type of preservative, said preservative is contained in the gel composition in amounts of 0.0001 to 1 wt. %.

The agent according to the invention preferably has an ointment-like, pasty and/or cream-like consistency.

In connection with the present invention, "gel" is preferably understood to mean a disperse system which consists of at least two components. The solid component forms a spongy, three-dimensional network, the pores of which are at least partially filled by a solvent.

The sanitary agents are preferably in the form of gels. Such gels preferably have a different micro- or nanostructure than conventional sanitary agents, and this, in particular in the case of toilet applications, not only leads to a specific visual appearance due to the transparency of the gel, but also allows a uniform release of additives such as dyes and in particular fragrance compositions.

Another aspect of the invention relates to the use of the sanitary agent, the agent being adhered to a sanitary object. The use preferably comprises the steps of: (a) providing the sanitary agent; and (b) adhering the sanitary agent to a surface of a sanitary object.

The sanitary agent according to this use is preferably adhered in such a way that it adheres directly to the surface of the sanitary object. In other words, the sanitary agent adheres by itself to the surface of the sanitary object.

In a preferred embodiment, the sanitary agent is adhered by means of an applicator. For this purpose, for example, syringes in the broadest sense, which contain the sanitary agent and from which the sanitary agent can be squeezed out, are suitable for placing said agent on the surface of the sanitary object.

The achieved adhesion to the sanitary object, preferably even when attached to a vertical surface, is such that the agent is not removed all at once even under the additional action of force of flushing water streams.

The sanitary agent can preferably be flushed away only after a large number of flushing processes. The number of flushing processes depends on the composition of the particular sanitary agent and also on the applied amount and the shape of the sanitary agent.

The sanitary agent can also be adhered to a plurality of points of the sanitary object simultaneously. For example, the agent can be applied to both the right and the left side of a toilet bowl. This allows a more even cleaning effect than application to only one side.

According to a further embodiment, the sanitary agent can be adhered to a sanitary object at various locations in different compositions. This makes it possible, for example, that two different perfuming substances which are spatially separated can be used for common fragrancing of the toilet.

In addition, the inventors have found that the sanitary agent described herein can also advantageously be provided in a WC basket. Another aspect relates to a system having the sanitary agent according to the invention and a WC basket that has at least one chamber, the sanitary agent being present in the chamber of the WC basket.

Another aspect of the invention relates to the production of the system according to the invention, comprising the steps of: (a) making the gel composition flowable by heating; (b) introducing the agent into the basket; and (c) cooling the composition, with the agent curing.

In a preferred embodiment, the chamber sleeve of the WC basket is completely closed on at least one side, and the composition is adhered to the completely closed side of the chamber sleeve.

The sanitary agent is preferably in the form of a gel. Such an agent in a WC basket in the form of a gel is a visually attractive, transparent product having an advantageous release characteristic with regard to dyes and, in particular, fragrances that can be contained in the composition as additives.

Due to the self-adhesive properties of the gel, said gel adheres to the surface of the WC basket. This has the advantage that the gel contained in the basket is not dissolved from the outside to the inside, as is the case with conventional toilet rim blocks, but has a dissolving behavior to the effect that the quantities of gel that adhere directly to the chamber wall of the WC basket are flushed away last. This results in particular in an improved release profile and a more visually appealing appearance over the entire service life of the WC rim block. Since the regions of the gel that the user can see from the outside, for example when using a transparent WC basket, are not removed until the end of its life, the original appearance of the WC rim block will hardly change until same is completely used up. However, this places specific demands on the flushing behavior of the gel from the surface of the chamber in which the gel is contained in the WC basket.

Insufficient flushing behavior of the inner chamber surface of the WC basket leads to unsightly, unevenly distributed gel residues on the surface of the chamber when using transparent WC baskets. WC baskets generally have a strongly bent or curved inner chamber surface (for example in the case of spherical WC baskets). Compared to the relatively smooth and uncurved surfaces of toilet bowls, to which sanitary agents can be attached directly without a WC basket, more pronounced residue formation can be observed when using WC baskets having a self-adhesive gel. An improvement in the flushing behavior is therefore particularly necessary when using a WC basket.

The chamber sleeve is preferably in the form of a sphere, i.e., is spherical, the chamber sleeve consisting, in one or two pieces, of a first hemisphere and a second hemisphere, which constitute a first side of the chamber sleeve and a second side of the chamber sleeve, respectively. The first side can be referred to as the front side, i.e., the side that is accessible or visible when in use and that faces away from the toilet bowl wall, while the second side can be referred to as the rear side, i.e., the side that is not directly accessible or visible when in use and that faces the toilet bowl wall and the flushing water running along said wall. The above division of the chamber sleeve into two sides can also be transferred accordingly to other chamber sleeve geometries, for example rectangular chamber sleeve geometries.

The front of the chamber sleeve preferably has no opening. This prevents a child or a pet from coming into contact with an active substance present in the chamber. In addition, since the first side of the chamber sleeve does not have an opening, the active substance can be poured into the basket during the manufacturing process through an opening in the second side. For WC baskets having one or more openings in the first side, the active substance would not remain in the basket when it was filled, but instead flow through said basket. According to the embodiment described, a WC basket can advantageously be filled with an active substance, the substance solidifying only after filling. It is therefore not necessary for the active substance to be preformed into the desired geometry (e.g., a sphere) and only then to be introduced into the chamber. Rather, the shaping is achieved by the active substance being poured into the chamber and the chamber geometry functioning as a mold during the solidification of the active substance. In particular, the described embodiment allows pasty agents to be used as active substances, since such pasty agents in gel form, due to their consistency and "tackiness," can be preformed and introduced into the chamber of the basket in their final form only with difficulty.

In the case of the agents according to the invention, it could be observed that they solidify or cure quickly without applying additional cooling. The resulting reduced energy consumption is less expensive and allows more ecological and efficient large-scale industrial production of the sanitary agents.

Another aspect of the invention relates to the use of the system, comprising the steps of: (a) providing the system having the sanitary agent according to the invention and a WC basket that has at least one chamber, the sanitary agent being present in the chamber of the WC basket; and (b) attaching the system to a sanitary object.

EXAMPLES

Agents E1 and E2 were provided. Agents C1, C2 and C3 were provided for comparison.

The amounts are given in percent by weight based on the total amount of the composition:

| | C1 | C2 | C3 | E1 | E2 |
|---|---|---|---|---|---|
| Ceteareth-25 EO | 30 | 30 | 20 | 30 | 20 |
| Fatty alcohol ethoxylate: C9 to C12 alkyl functional group; 8 EO | 15 | 10 | 5 | 10 | 5 |

-continued

| | C1 | C2 | C3 | E1 | E2 |
|---|---|---|---|---|---|
| Sodium laureth sulfate | 0 | 3.5 | 7 | 3.5 | 7 |
| Fragrances | <1 | <1 | <1 | <1 | <1 |
| Dyes | <1 | <1 | <1 | <1 | <1 |
| Preservatives | <1 | <1 | <1 | <1 | <1 |
| Water | remainder | remainder | remainder | remainder | remainder |
| pH | neutral | neutral | neutral | acidic | acidic |
| Foaming behavior | − | ++ | ++ | ++ | ++ |
| Biofilm prevention | − | − | − | ++ | ++ |

For the examples described, the gel compositions were inserted in WC baskets and attached to the rim of the toilet bowl.

In toilets, biofilms can quickly form in the bowl. For reasons of hygiene, it is desirable to prevent biofilm formation or to remove existing biofilms. It has been observed that the neutral gel compositions are only insufficiently suitable for preventing biofilm formation. The acidic compositions, however, prevent biofilm formation. If an anionic surfactant is also used, good foaming behavior and prevention of biofilm formation can be achieved simultaneously.

What is claimed is:

1. A system having (a) a water closet basket that has at least one transparent chamber comprising:

(i) a first side that is visible and faces away from the toilet bowl wall; and (ii) a second side that is not visible and faces the toilet bowl wall, wherein the first side is completely closed, and (b) an acidic self-adhesive sanitary agent in gel form comprising at least one non-ionic adhesion promoter comprising at least one hydrophobic functional group and a hydrophilic group and wherein said agent has a pH of 2 to 6 measured in a 10% solution of the agent in water;

wherein the self-adhesive sanitary agent adheres to the first side of the at least one transparent chamber and is visible but inaccessible to a user;

wherein the self-adhesive sanitary agent is not dissolved from the outside to the inside, and wherein the visible quantities of the self-adhesive sanitary agent in gel form is configured such that the gel directly adhered to the first side are chamber sleeve is dissolved last.

2. The system according to claim 1, wherein the self-adhesive sanitary agent also comprises an anionic surfactant.

3. The system according to claim 2, wherein the anionic surfactant is an ether sulfate.

4. The system according to claim 2, wherein the anionic surfactant is present in an amount of 1 wt. % to 20 wt. % based on the total amount of the self-adhesive sanitary agent.

5. The system according to claim 1, wherein the non-ionic adhesion promoter is a fatty alcohol alkoxylate.

6. The system according to claim 1, wherein the self-adhesive sanitary agent comprises a further non-ionic surfactant.

7. The system according to claim 6, wherein the further non-ionic surfactant is a fatty alcohol alkoxylate.

8. The system according to claim 7, wherein the fatty alcohol alkoxylate has a C9 to C12 alkyl functional group.

9. Preparation of a system according to claim 8, comprising the steps of:

making the gel flowable by heating;

introducing the self-adhesive sanitary agent into the basket; and cooling the composition, wherein the self-adhesive sanitary agent cures.

10. The system according to claim 2, wherein the self-adhesive sanitary agent has a pH of 3 to 5 measured in a 10% solution of the self-adhesive sanitary agent in water.

11. The system according to claim 3, wherein the anionic surfactant is a fatty acid ethyl ether sulfate.

12. The system according to claim 3, wherein the anionic surfactant is a lauryl ether sulfate.

13. The system according to claim 4, wherein the anionic surfactant is present in an amount of 2 wt. % to 10 wt. % based on the total amount of the self-adhesive sanitary agent.

14. The system according to claim 5, wherein the non-ionic adhesion promoter has a degree of alkoxylation of 20 to 50 EO.

15. The system according to claim 5, wherein the non-ionic adhesion promoter has a degree of alkoxylation of 20 to 45 EO.

16. The system according to claim 7, wherein the further non-ionic surfactant is a fatty alcohol alkoxylate having a degree of alkoxylation of 5 to 15 EO.

17. The system according to claim 8, wherein the alkyl group is an unbranched alkyl functional group.

* * * * *